INVENTOR.
ARTHUR H. JORDAN

BY Arthur H. Swanson

ATTORNEY.

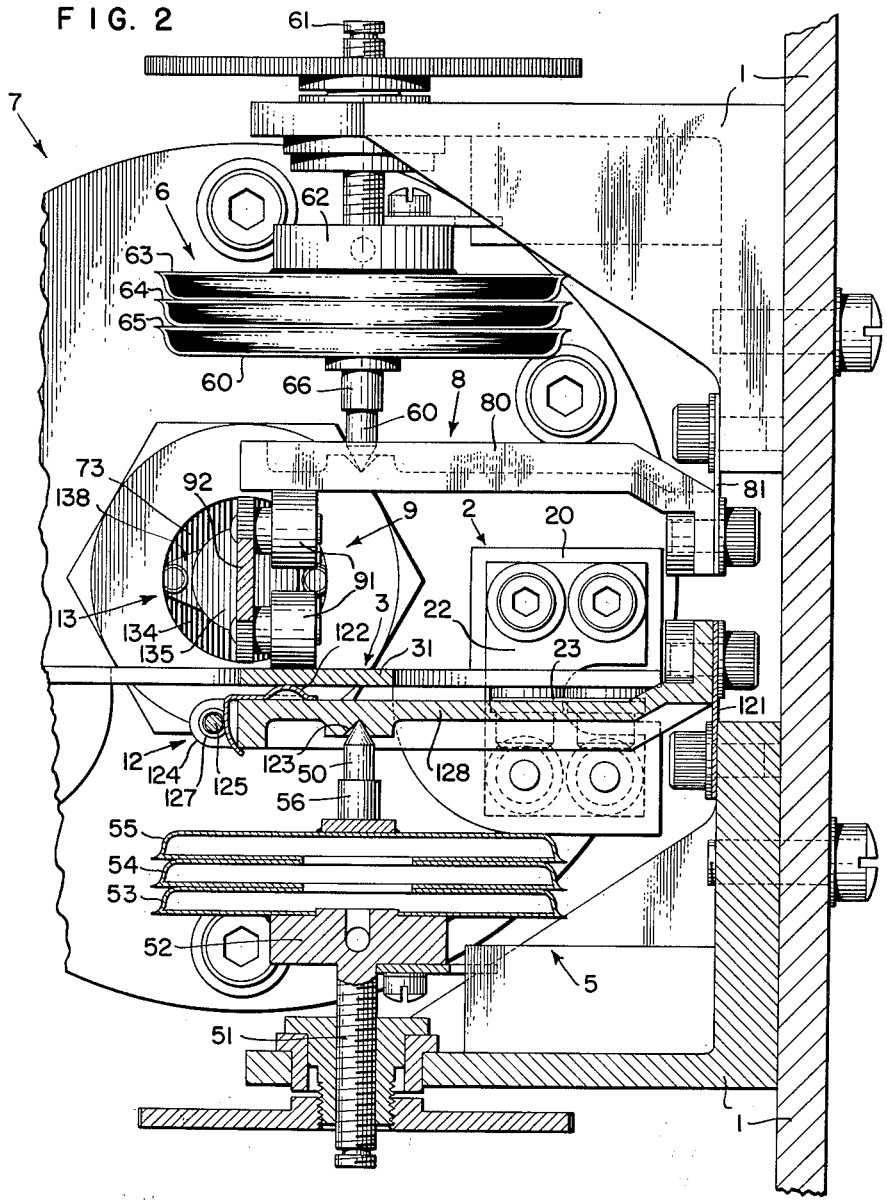
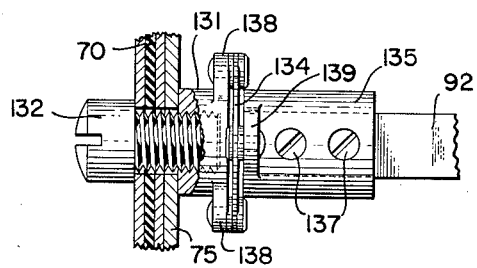

Feb. 26, 1963 A. H. JORDAN 3,079,074
CONTROLLER
Filed Feb. 17, 1960 4 Sheets-Sheet 3
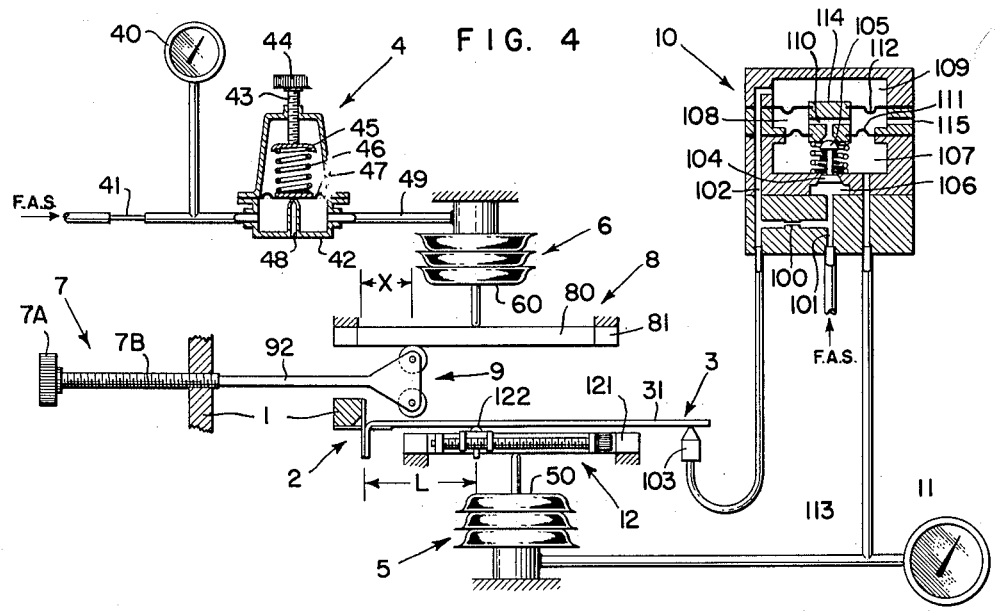
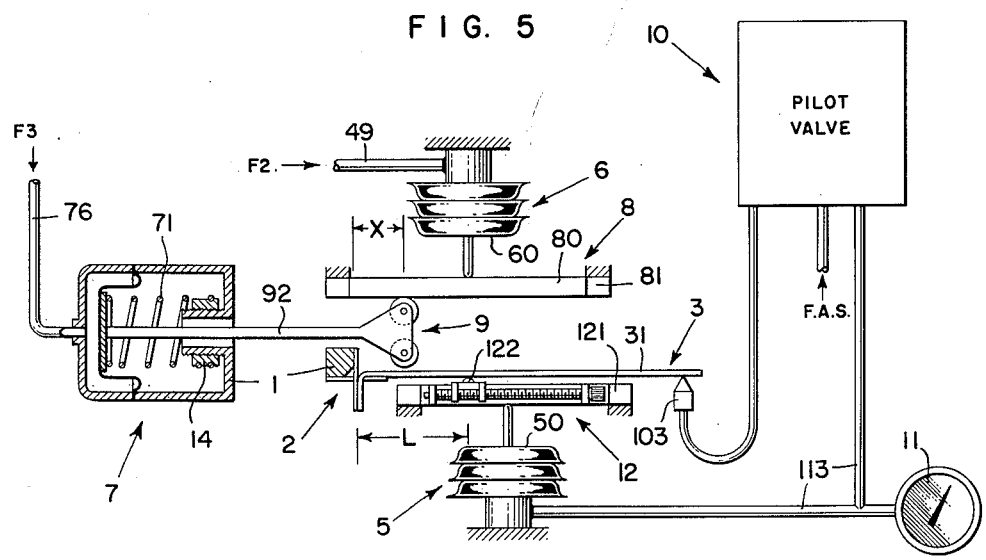
INVENTOR.
ARTHUR H. JORDAN
BY *Arthur H. Swanson*
ATTORNEY.

Feb. 26, 1963   A. H. JORDAN   3,079,074
CONTROLLER
Filed Feb. 17, 1960   4 Sheets-Sheet 4

*INVENTOR.*
ARTHUR H. JORDAN
BY *Arthur H. Swanson*
ATTORNEY.

United States Patent Office 3,079,074
Patented Feb. 26, 1963

3,079,074
CONTROLLER
Arthur H. Jordan, Bala-Cynwyd, Pa., assignor to Minneapolis-Honeywell Regulator Company, Minneapolis, Minn., a corporation of Delaware
Filed Feb. 17, 1960, Ser. No. 9,307
6 Claims. (Cl. 235—61)

This invention relates to fluid-pressure-operated computers. Such computers are adapted to receive an input signal and to produce an output signal which will measure, indicate, record or control other mechanism in response to the input signal. Moreover, such computers are adapted to produce an output signal which varies as some mathematical function of the input signal. This computer can perform the mathematical operations of: multiplication, division, raising to powers, extracting roots, or producing an output signal which is at a constant ratio to or fixed proportion of the input signal.

It is an object of this invention to provide means whereby an input signal is applied to the computer with a force that is varied without varying the force applied to the computer by the other input or feed-back signals. The mechanical advantage by which the force is applied to the computer can be set and then fixed at the value so set.

It is a further object of this invention to provide means whereby the means for applying an input signal to the computer can be standardized without varying the other input signals or other feed-back signals applied to the computer.

It is a still further object of this invention to provide a motor for operating a force-transmitting means applying an input signal to the computer without varying the force applied to the computer by the other input signals or feed-back signals and to provide means between this motor and the force-transmitting means so that there is a lost motion between the motor and the force-transmitting means. This lost motion permits the force-transmitting means to accommodate itself to slight misalignments in the connection between the force applied thereto and the force put out thereby.

Another object of this invention is, in a motor operated by the varying pressure of a fluid applied in opposition to a spring, to provide means for adjusting the gradient of the spring and consequently, the pressure required to operate the motor.

A better understanding of the present invention may be had from the following detail description when read in connection with the accompanying drawings, in which:

FIG. 2 is a vertical, transverse cross section on line 2—2 of FIG. 1 as viewed in the direction of the arrows.

FIG. 3 is a vertical, longitudinal, cross section on an enlarged scale of a portion of FIG. 1.

FIG. 4 is a diagrammatic or schematic view of the computer arranged to produce an output signal which is at a constant ratio to or fixed proportion of the input signal.

FIG. 5 is a diagrammatic or schematic view of a computer arranged to complete an output signal which is at a fixed ratio or constant proportion to the input signal and with means for the pneumatic adjustment of the ratio. By adjustment of this ratio or proportion the mathematical operation of multiplication is performed.

Figure 1:
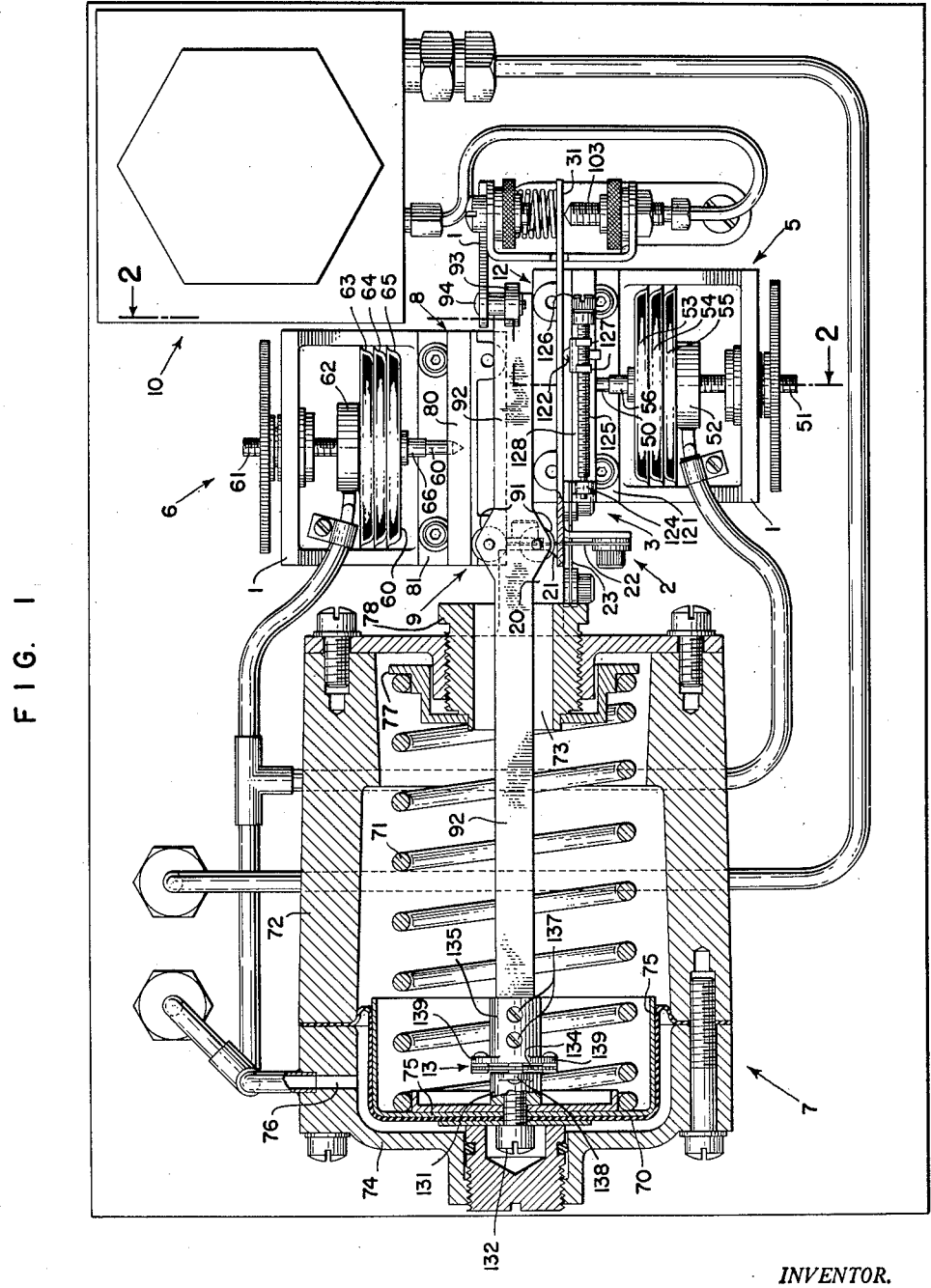
FIG. 1 is a side elevation of the device with parts in vertical, longitudinal, cross section.

FIG. 4 shows a computer comprising a stationary element 1 on which the remaining parts of the computer are mounted. Element 1 supports a fixed pivot 2 on which is pivotally mounted a lever 3 having a movable end 31 which cooperates with a stationary nozzle 103 to form a first flapper-nozzle valve.

Means 4 are provided for adjusting the input signal. Means 4 may be manually operable, as shown, or may be operated by any one of a number of well-known transducers in which an input is converted to a fluid pressure. Such inputs may be any one or more of a large number of variables such as pressure, temperature, electricity, etc. These means comprise a source of fluid under pressure F.A.S. This fluid may be an incompressible liquid or an elastic gas. A fixed restriction 41 connects to an input pressure gauge 40 and to a manually operable, pressure regulator comprising a rigid case 42 in which is mounted a flexible diagram 47 stressed by a spring 46 having a cap 47 at one end thereof. A screw 43 is manually mounted in case 42 and has a handle 44 at one end and bears on cap 45 at the other. Manual adjustment of handle 44 varies the force which spring 46 exerts on diaphragm 47 and, consequently the exhaust of fluid from the case 42 through vent 48.

Fluid under the pressure so regulated is fed to a second fluid-pressure-operated motor 6. Motor 6 has a movable end 60 which bears upon means 8 for applying a force at a constant mechanical advantage from motor 6 to force transmitting means 9. Means 8 comprise a cantilever 80 which is mounted on element 1 by means of a stationary pivot 81 which has its axis at an angle to the axis of pivot 2.

Manually operable means 7, comprising a screw 78 mounted in element 1 and having a head 7A, are movable to adjust a force-transmitting means 9 attached thereto.

Flapper-nozzle valve 31—103 controls the action of relay 10 which is connected to a source F.A.S. of fluid under pressure and is adapted to vary pressure of a supply of fluid from said source.

Relay 10 puts out an output signal which is connected to an output element 11 comprising an indicator, recorder or controller of well known construction.

The output relay 10 is also connected to a first fluid-pressure-operated motor 5 having a movable end 50 which bears upon a manually adjustable cantilever 12 mounted on element 1 by means of a fixed pivot 121. Manually adjustable cantilever 12 receives the force of the movable end 50 of first fluid-pressure-operated motor 5 and transmits the force from motor 5 to lever 3 by means of a knob 122 on cantilever 12 bearing on lever 3.

The pilot valve or relay 10 comprises a source of fluid under pressure F.A.S. connected to a restriction 100 and, by means of conduit 101, to an inlet chamber 106. An inlet valve 104 cooperates with a stationary valve seat to control the admission of fluid from inlet chamber 106 to output chamber 107. An outlet or exhaust valve 105 cooperates with a stationary valve seat in a movable block 114 having an outlet conduit 110 therethrough. Outlet conduit 110 permits the passage of fluid from the output chamber 107 to the outlet chamber 108 which communicates with the surrounding atmosphere through a vent 115. The movable block 114 is mounted for limited movement by means of flexible diaphram 111, which separates output chamber 107 from outlet chamber 108 and by, flexible diaphragm 112, which separates outlet chamber 108 from nozzle pressure chamber 109.

The off-going side of restriction 100 communicates with a conduit 102 which terminates, one end, at a perforated nozzle 103, and, at the other end, at the nozzle pressure chamber 109.

The operation of the pilot valve or relay 10 is as follows. When the pilot valve or relay 10 is in the steady state or balanced condition, the inlet valve 104 and the outlet valve 105 are closed against their respective valve seats and the pressures within the pilot valve 10 are balanced.

If flapper 31 moves closer to nozzle 103, the flow of fluid through the nozzle 103 is diminished. Therefore the pressure in nozzle chamber 109 is increased. This increased pressure in chamber 109 acts on flexible diaphragm 112 and causes outlet valve 105 to remain closed but opens inlet valve 104. Fluid at the pressure of the source enters conduit 101 to inlet chamber 106 and through inlet valve 104 to output chamber 107.

The pressure of the fluid in chamber 107 acts on diaphragm 111 in the opposite direction to the direction in which the pressure in chamber 109 acts on diaphragm 112. When the pressures of the fluid in chambers 107 and 109 are equal, or at some other predetermined ratio to each other, the inlet valve 104 closes and the pilot valve or relay 10 remains in a stabilized or balanced position.

If flapper 31 moves away from nozzle 103, the flow of fluid through the nozzle 103 is increased and the reverse sequence of the operations described takes place so that the pressure in the output chamber 107 is decreased.

The operation of the computer shown in FIG. 4 is as follows: Assuming that the computer is in a steady state or balanced condition, the input signal regulating means 4 is adjusted by turning the handle 44 so as to vary the pressure applied to the second motor 6. Variation of the pressure in second motor 6 causes cantilever 8 to rock about pivot 81 and to apply a force to force-transmitting means 9. Force-transmitting means 9, in turn, apply this force to lever 3 and cause it to rock about its pivot 2. Movement of the free end 31 of lever 3 relatively to stationary nozzle 103 varies the escape of fluid from the nozzle 103 and causes pilot valve 10 to put out an output signal which fed to the output element 11 and to the first fluid-pressure-operated motor 5. Change of the pressure of the fluid in motor 5 causes the movable element thereof to vary the manually adjustable cantilever 12 so as to vary the force which is applied to the lever 3. The force from motor 5 is a feed-back force and balances the force applied to motor 6. This balance of forces causes the flapper-nozzle valve 31—103 to assume a new position, and to cause an output pressure signal to move the output element 11 to indicate, record, or control in accordance with the new value of the output signal.

If it is desired to have the output signal at some other ratio or proportion to the input signal, means 7 for moving force-transmitting means 9 are actuated so as to vary the distance X of the force-transmitting means 9 from the axis of the fixed pivot 2. Since force-transmitting means 9 moves parallel to the axis of cantilever 8 and at an angle to the axis of the fixed pivot 2 of the lever 3, the force applied by motor 6 to lever 3 can be varied without varying the force applied from the motor 5 to lever 3. Thus the computer operates in an exceedingly simple and accurate manner.

The equations representing the multiplication performed by the device shown in FIG. 4 are as follows.

In these equations: The force put out by the motor 5 equals F1.

The distance of the point of application of force F1 on lever 3 from the pivot 2 equals L.

The force put out by the motor 6 equals F2.

The distance of the application of force F2 to the force-transmitting means 9 and—hence to the lever 3 equals X.

Placing the above values in equations:

$$(F1)(L) = (F2)(X)$$

Since L is a constant, F1 equals (F2)(X).

For each position of the force-transmitting means 9 X is fixed but it can be varied by operating the distance-varying means 7 and fixed in a new position.

FIGS. 1, 2 and 3 show the mechanical construction of the computer. On the stationary element 1 is mounted first pivot 2. Pivot 2 comprises a stationary block 20 having a corner 21 cut away. To block 20 and to one end of lever 3 are connected a vertical flat strip 22 and a horizontal flat strip 23. These strips constitute a flexure or cross spring pivot.

Lever 3 comprises a rigid element pivotally movable about pivot 2 and having a free end 31 movable relative to a stationary nozzle 103.

First motor 5 and second motor 6 are duplicates so that a description of one will suffice. First motor 5 is mounted on stationary element 1 by means of a screw 51 which attaches at its upper end to perforated block 52. Block 52 supports rigid diaphragms 53, 54 and 55. The upper face of diaphragm 53, both faces of diaphragm 54, and the lower face of diaphragm 55 are perforated so that these diaphragms form a hollow motor which flexes at its rim. Diaphragm 55 carries, on its upper face, a pin 56 having a movable end 50.

Second motor 6 comprises parts similar to those of motor 5. These parts are numbered 61, 62, 63, 64, 65 and 66.

FIGS. 1 and 2 show that the manually adjustable cantilever 12 comprises a flat, flexible strip 121 constituting a pivot. Strip 121 is connected to a flat face of element 1 and to a flat face of cantilever 128. A cup 123 having a conical depression therein receives the end 50 of motor 5 in it. At its free or movable end cantilever 128 has a pair of ears 124 having inner, flat surfaces into which are mounted cylindrical surfaces of a screw 125 having a slotted head 126. Screw 125 threadedly engages ears 127 which move L-shaped member or knob 122 along lever 3. Screw 125 thus serves to vary distance L between the pivot 2 and the point of application of the force from the motor 5 to the lever 3 by means of L-shaped member 122 and to lock this point in this adjusted position.

Cantilever 8 is similar to manually adjustable cantilever 12.

The means 7 for adjusting the position of the force-transmitting means 9 may comprise a fluid-pressure-operated motor. FIG. 1 shows such a motor comprising a flexible diaphragm 70 attached its rim to a rigid case 72 having an open end 73 and closed end 74. A spring 71, whose spring gradient is designated K bears, at one end, on a cup 77 on rigid case 72 and, at the opposite end, against a cup 75 which engages one side of diaphram 70. Thus a chamber of various size is enclosed within case 72 between closed end 74 and diaphragm 70. Fluid under pressure is admitted to or exhausted from this closed chamber through conduit 76, a perforated screw 78 carries cup 77 on it and has screw-threaded engagement with rigid case 72. Screw 78 thus provides means for adjusting the tension and, consequently, the gradient K of spring 71.

FIGS. 2 and 3 show lost motion connection or universal joint 13 located between the pressure-transmitting means 9 and the means 7 for adjusting its position. This universal joint comprises a cup 131 connected by means of a screw to cup 75 and diaphragm 70. Cup 131 has a pair of ears 138 projecting vertically therefrom as seen in FIGS. 1 and 3. A flexible disc 134 is connected to ears 138. A second cup 135 has a pair of ears 139 projecting therefrom in a horizontal direction, as seen in FIGS. 1 and 3. Ears 139 are attached to disc 134 at an angle of ninety degrees to ears 138. Cup 135 has a cyclindrical portion which is attached by means of screws 137 to rod 92 on which friction-reducing, pressure-transmitting discs are pivotally mounted. The right hand end of beam 92 is guided by means of a pair of rollers 93 mounted on pivots 94 on stationary element 1.

FIG. 5 shows the computer connected so as to give an output pressure which is at a fixed ratio or constant proportion of the input pressure. This ratio or proportion can be varied by varying the pressure in motor 7. One input pressure is fed to motor 6 and is varied by a pressure-regulating means, such as manually operable pressure regulator 4. Any variation of the pressure of the fluid in the motor 6 causes cantilever 8 to rock about its stationary pivot 81 to vary the force transmitted to the force-transmitting means 9 and causes lever 3 to rock about its stationary pivot 2 which varies the distance between the flapper 31 and stationary nozzle 103.

A second input signal is fed to motor 7 by means of a conduit 76 containing a fluid whose pressure is varied by means of a pressure regulator, such as pressure regulator 4. Variation in the pressure of the fluid applied to motor 7 compresses spring 71 and moves force-transmitting means 9 toward or away from stationary pivot 2. This varies the point of application of the force from motor 6 to lever 3

Movement of flapper 31 relative to nozzle 103 varies the output pressure from the pilot valve or relay 10. This output pressure from the pilot valve or relay 10 is conducted by conduit 113 to the output element 11 where it causes the output element 11 to indicate, record or control in response to this variation of the output pressure. The output pressure from pilot valve or relay 10 is also fed to first fluid-pressure motor 5. Variation of the pressure applied to first fluid-pressure-operated motor 5 causes manually adjustable cantilever 12 to rock about pivot 121 and to vary the force applied to lever 3 by means of knob 122. This feed-back force from motor 5 to lever 3 continues until flapper-nozzle valve 31—103 causes the output pressure of the pilot valve or relay 10 to rebalance the input pressure.

The equations for the modification shown in FIG. 5 are the same as those for the modification shown in FIG. 4.

FIG. 5 also shows the computer arranged for the mathematical operation of multiplication by varying the pressure input to motor 7. One input signal is applied to motor 6 in the form of fluid-pressure which is varied by means of a fluid-pressure-regulator 4. Variation in the pressure of the fluid in motor 6 causes cantilever 8 to rock about the stationary pivot 81 to vary the force that motor 6 applies through force-transmitting means 9 to lever 3. A second input force is fed to motor 7 in the form of fluid under pressure which pressure may be varied by means of a fluid-pressure-regulator 4. Variation of the pressure in the motor 7 causes the pressure-transmitting 9 to move toward or away from the axis of stationary pivot 2 and thus varies the point at which the force from the motor 6 is applied to the lever 3. The variation in the force applied to the lever 3 from motor 6 and the variation in the point of application of this force to lever 3 causes flapper to move relative to nozzle 103 and thus to vary pressure put out by pilot valve or relay 10. The pressure put out by pilot valve or relay 10 is conducted by a conduit 113 to the output element 11. The variation of the pressure applied to the output element 11 causes the element to indicate, record or control in response to the pressure applied to it. The output pressure from pilot valve or relay 10 is also applied to first-fluid-pressure-motor 5 so as to cause a variation in the force put out by motor 5. The movement of motor 5 causes manually adjustable cantilever 12 to rock about its stationary pivot 121 and to apply a force to lever 3 by means of knob 122. Flapper 31 moves relative to nozzle 103 until the forces applied to the lever 3 have counter-balanced one another.

In these equations:
F1 equals the force put out by the motor 5.
L equals the distance from the axis of the pivot 2 to the point of engagement between knob 122 and lever 3.
F2 equals the force put out by motor 6.
X equals the distance from the axis of pivot 2 to the point of engagement between force-transmitting means 9 and lever 3.
K equals the gradient of spring 71.
F3 equals the force put out by motor 7.

Placing the above values in equations:

(F1)(L) equals (F2)(X)
X equals (K)(F3)
Therefore, (F1)(L) equals (F2)'F3)(K).

Since L, K, and X are constants, F1 equals (F2)(F3).

Figure 6:
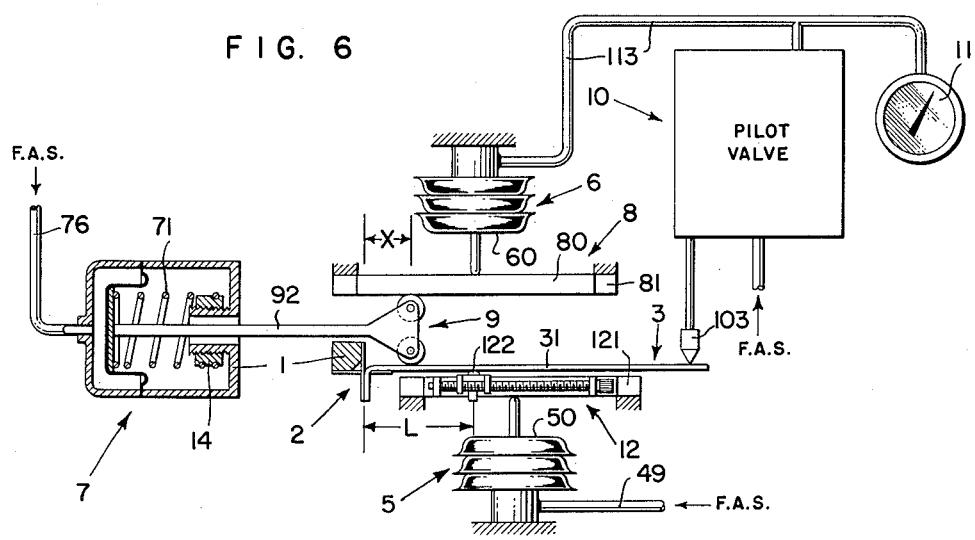
FIG. 6 is a diagrammatic or schematic view of a computer arranged for division.

FIG. 6 shows the computer arranged for the mathematical operation of division. In FIG. 6 one input signal comprises a fluid pressure applied to first fluid-pressure-motor 5. This input pressure is varied by means of a fluid-pressure-regulator 4. Variations in the fluid pressure applied to motor 5 causes manually adjustable cantilever 12 to rock about its stationary pivot 121 and to vary the force applied by the first motor 5 to lever 3. A second input signal is fed to the computer in the form of a fluid pressure applied to motor 7. Variation in the pressure applied to motor 7 causes force-transmitting means 9 to move to or away from stationary pivot 2. This varies the point at which the force from motor 6 is applied to lever 3. Variation in the force applied from motor 5 to lever 3 causes flapper 31 to move relative to stationary nozzle 103. This varies the force put out by pilot valve or relay 10. The pressure put out by pilot valve or relay 10 is fed to output element 11 and causes the output 11 to indicate, record or control in response to this output pressure. The output pressure from lever 10 is also fed to second fluid-pressure-operated motor 6. Variation in the pressure of the fluid applied to motor 6 causes cantilever 8 to rock about its stationary pivot 81 and to apply the force put out by second motor 6 through force-transmitting means 9 to lever 3.

The equations for the mathematical operation of division as shown in the device of FIG. 6 are as follows:

(F1)(L) equals (F2)(X)
X equals (F3)(K)
(F1)(L) equals (F2)(F3)(K)
F2 equals (F1)(L) divided (F3)(K)

Since L and K are constants F2 equals F1 divided by F3.

Figure 7:
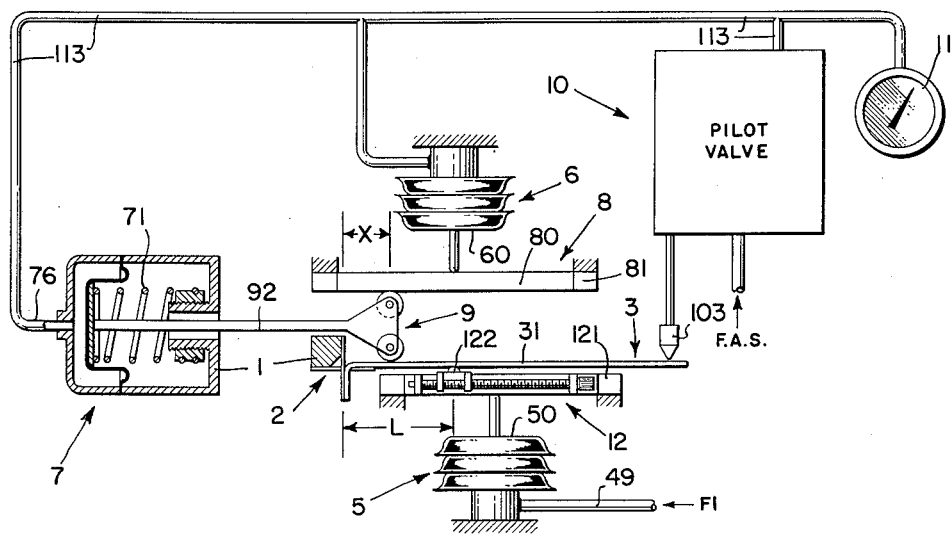
FIG. 7 is a diagrammatic or schematic view of the computer arranged for square root extraction.

FIG. 7 shows the device of FIGS. 1, 2 and 3 connected to perform the mathematical function of square root extraction. In FIG. 7 the pressure of the fluid in conduit 49 is varied by some means for varying the pressure of a supply of fluid, such as a manually operable relay 4 shown in FIG. 4. A variation in the pressure applied to the first fluid-pressure-operated motor 5 causes manually adjustable cantilever 12 to rock about its stationary pivot 121 and to vary the force which motor applied to lever 3 through knob 122. This variation in the force applied to lever 3 causes flapper 31 to move relative to nozzle 103 and to vary the pressure put out by the pilot valve or relay 10. This variation of the output pressure of pilot valve or relay 10 is conducted by the conduit 113 to output element 11, to the second fluid-pressure-operated motor 6, and to the means 7 for adjusting the pressure-transmitting means 9. This variation in the output pressure causes the output 11 to indicate, record or control in accordance with this pressure. The variation in the pressure applied to second fluid-pressure-operated motor 6 causes cantilever 8 to rock about its stationary pivot 81 and to transmit a feed-back force through force-transmitting means 9 to lever 3. This feed-back continues until the flapper 31 rebalances the pressure put out by the pilot valve or relay 10. Since the output pressure in conduit 113 is applied to the inlet connection 76 of the motor 7, the pressure-transmitting means 9 are moved along lever 3 so as to vary the distance X between the pivot 2 and the point of application of the pressure-transmitting means 9 to the lever 3.

The equations for the mathematical function of square root extraction are as follows.

In these equations:
F1 equals the force put out by the motor 5.

L equals the distance from the axis of pivot 2 to the point of engagement between knob 122 and lever 3.

F2 equals the force put out by the second motor 6.

X equals the distance between the axis of pivot 2 and the point of engagement between the force-transmitting means 9 and lever 3.

K equals the gradient of spring 71.

Placing the above values in equations:

$$(F1)(L) \text{ equals } (F2)(X)$$
$$X \text{ equals } (F2)(K)$$

Therefore (F1)(L) equals (F2)(K)(F2)(X).

Since K, L and X are constants, F1 equals (F2)(F2), F2 equals square root of F1.

In summary, this invention comprises a computer which performs the mathematical operations of multiplication, division, square root extraction, or squaring in a simplified and improved manner. This simplification and improvement is achieved by varying the point at which one input or feed-back force is applied to the lever without varying the point at which the other input or feed-back force is applied to the lever. The means for varying the point at which an input or feed-back force is applied to the lever can be operated manually or automatically. The point at which the input or feed-back force from each motor applied to the lever can be varied manually or automatically and locked in that varied position.

What is claimed is:

1. In an air-pressure-operated computer adapted for connection to a source of air under pressure, a first stationary pivot, a first lever mounted for turning movement about said stationary pivot, a first air-pressure-operated motor mounted to apply a force to said lever at a fixed distance from said first pivot, a second air-pressure-operated motor, a cantilever mounted to receive the force of said second motor, a stationary pivot for said cantilever at an angle to said stationary pivot for said first lever, friction-reducing pressure-transmitting means contacting said first lever and said cantilever and mounted for movement parallel to the pivot for said cantilever and at an angle to the pivot for said first lever, and operating to transmit the force from said second motor to said lever in the direction opposite to the force from said first motor, a third air-pressure-operated motor having a hollow rigid case, a flexible diaphragm forming a flexible wall of said case, a universal joint having one part connected to said diaphragm, a rod connected to the other part of said universal joint and to said friction-reducing means to move said friction-reducing means, a flapper-nozzle valve mounted so as to be moved by said first lever and adapted for connection to said source of air under pressure so as to vary the pressure of a first supply of air from said source, a relay adapted for connection to said source of air and connected under the control of said flapper-nozzle valve in the connection with said first supply of air and providing a second supply of air to at least one of said motors, a connection between said second supply of air and at least one of said motors, a connection between at least one of said motors other than those connected to said second supply of air and to a third supply of air under pressure which is adapted for connection to said source of air and which is varied to provide an input signal, and an output element connected to said second or to said third supply of air under pressure so as to be actuated thereby.

2. In an air-pressure-operated computer adapted for connection to a source of air under pressure, a first stationary pivot, a first lever mounted for turning movement about said stationary pivot, a first air-pressure-operated motor connected to apply a force to said lever, means for adjusting the point at which said first motor applies a force to said first lever and for locking said point at a fixed distance from said first pivot, a second air-pressure-operated motor mounted to apply a force to said first lever in the opposite direction to the force applied by said first motor, a cantilever mounted to receive the force of said second motor and to transmit said force, a stationary pivot for said cantilever at an angle to said stationary pivot for said first lever, friction-reducing pressure-transmitting means contacting said first lever and said cantilever and mounted for movement parallel to the pivot for said cantilever and at an angle to the pivot for said first lever, a third air-pressure-operated motor connected to said friction-reducing means to move it, a flapper-nozzle valve mounted to be moved by said lever and adapted for connection to said source of air under pressure so as to vary the pressure of a first supply of air from said source, a connection between said first supply of air and at least one of said motors, means connecting at least one of said motors other than those connected to said first supply of air to a second supply of air under pressure which is adapted for connection to said source of air and which is varied to provide an input signal, and an output element connected to said first supply of air under pressure so as to be actuated thereby.

3. In an air-pressure-operated computer, a first lever pivotally mounted on a first pivot, means applying a force to said first lever, means adjusting the point at which said means applies a force to said first lever and locking said point at a fixed distance from said pivot, said means comprising, a flat flexible strip constituting a pivot, a cantilever mounted on said strip for pivoting movement and having a conical depression in it which receives the movable portion of said means applying a force to said first lever and having a pair of ears, a screw mounted for rotation in said ears, and an L-shaped member having on it a second pair of ears having screw-tight engagement with said screw and having on it a hemispherical knob engaging said first lever, a second lever pivotally mounted on a second pivot having an axis at an angle to the axis of said first pivot, means applying a force to said second lever in the opposite direction to the force applied to said first lever, force-transmitting means movable linearly along said first lever and said second lever at an angle to said first pivot and parallel to said second pivot for transmitting to said first lever force applied to said second lever and to said force-transmitting means, whereby the force from said second lever is applied to said force-transmitting means and to said first lever at a mechanical advantage which is constant and the distance between first pivot and said force-transmitting means is varied.

4. In an air-pressure-operated computer, a first lever pivotally mounted on a first pivot, means applying a force to said first lever, a second lever pivotally mounted on a second pivot having an axis at an angle to the axis of the first pivot, means applying a force to said second lever in the opposite direction to the force applied to said first lever, an air-pressure-operated motor having a movable element, a universal joint comprising, a first cup connected to the movable element of said motor and having a pair of ears thereon, a flexible disc connected to said ears, a second cup having a pair of ears thereon connected to said disc at points spaced from the points at which said disc is connected to the ears on said first disc, force-transmitting means connected to the second cup of said universal joint and movable linearly thereby along said first lever and said second lever and at an angle to said first pivot and parallel to said second pivot for transmitting to said first lever force applied to said second lever and to said force-transmitting means, whereby the force from said second lever is applied to said force-transmitting means and to said first lever at a mechanical advantage which is constant and the distance between said pivot and said force-transmitting means is varied.

5. In an air-pressure-operated computer, a first lever pivotally mounted on a first pivot, means applying a force to said first lever, a second lever pivotally mounted on a second pivot having an axis at an angle to the axis of said first pivot, an air-pressure-operated motor comprising a plurality of rigid diaphragms connected together at their rims and movable relative to each other, said motor applying a force to said second lever in the opposite direction to the force applied to said first lever, force-transmitting means movable linearly along said first lever and said second lever at an angle to said first pivot and parallel to said second pivot for transmitting to said first lever force applied to said second lever and to said force-transmitting means, whereby the force from said second lever is applied to said force-transmitting means and to said first lever at a mechanical advantage which is constant and the distance between said first pivot and said force transmitting means is varied.

6. In an air-pressure-operated computer, a first lever pivotally mounted on a first pivot, means applying a force to said first lever, a second lever pivotally mounted on a second pivot having an axis at an angle to the axis of said first pivot, means applying a force to said second lever in the opposite direction to the force applied to said first lever, force-transmitting means movable linearly along said first lever and said second lever at an angle to said first lever, force-transmitting means movable linearly along said first lever and said second lever at an angle to said first pivot and parallel to said second pivot for transmitting to said first lever a force applied to said second lever and to said force-transmitting means, an air-pressure-operated motor connected to said force-transmitting means to move it, a spring opposing the action of said motor on said force-transmitting means, and means for adjusting the tension of said spring so as to vary the pressure required to operate the force-transmitting means.

References Cited in the file of this patent

UNITED STATES PATENTS

| | | |
|---|---|---|
| 1,246,445 | Ludeman | Nov. 13, 1917 |
| 2,317,293 | Newell | Apr. 20, 1943 |
| 2,394,284 | Berges | Feb. 5, 1946 |
| 2,487,310 | Chandler | Nov. 8, 1949 |
| 2,507,498 | Brown | May 16, 1950 |
| 2,910,084 | Frantz | Oct. 27, 1959 |